US009930420B2

(12) United States Patent
Peng

(10) Patent No.: US 9,930,420 B2
(45) Date of Patent: Mar. 27, 2018

(54) METHOD AND APPARATUS FOR CONFIGURING SOFTWARE RESOURCES FOR PLAYING NETWORK PROGRAMS

(75) Inventor: Yang Peng, Shanghai (CN)

(73) Assignee: KONIKLIJKE PHILIPS N.V., Eindhoven (NL)

(*) Notice: Subject to any disclaimer, the term of this patent is extended or adjusted under 35 U.S.C. 154(b) by 2284 days.

(21) Appl. No.: 11/721,569

(22) PCT Filed: Dec. 8, 2005

(86) PCT No.: PCT/IB2005/054114
§ 371 (c)(1),
(2), (4) Date: Oct. 19, 2009

(87) PCT Pub. No.: WO2006/067656
PCT Pub. Date: Jun. 29, 2006

(65) Prior Publication Data
US 2010/0088694 A1    Apr. 8, 2010

(30) Foreign Application Priority Data
Dec. 23, 2004    (CN) .......................... 2004 1 0081676

(51) Int. Cl.
*H04N 21/488* (2011.01)
*H04N 21/44* (2011.01)
*G06F 9/445* (2018.01)

(52) U.S. Cl.
CPC ..... *H04N 21/4884* (2013.01); *G06F 9/44505* (2013.01); *H04N 21/44016* (2013.01)

(58) Field of Classification Search
CPC ............ G06F 9/44505; H04N 21/4884; H04N 21/44016
See application file for complete search history.

(56) References Cited

U.S. PATENT DOCUMENTS 5,805,153 A * 9/1998 Nielsen .............. H04N 5/44513
348/468
6,049,671 A * 4/2000 Slivka et al. ................. 717/173
(Continued)

FOREIGN PATENT DOCUMENTS

EP    1309204 A1    5/2003
EP    1569130 A1    8/2005
(Continued)

*Primary Examiner* — Lewis A Bullock, Jr.
*Assistant Examiner* — Jacob Dascomb

(57) ABSTRACT

The present invention provides a method and apparatus for configuring software resource for playing network programs. A request for downloading network programs transmitted by a user terminal to a network server includes the configuration information of software resources at the user terminal. After comparing and balancing the software resources required for playing network programs and the software resources at the user terminal, the network server transmits to the user terminal the software resource that is required for playing programs but are absent at the user terminal. The user terminal combines the received software resource with the local software resources to play the downloaded network programs. The user terminal can sufficiently configure the software resources required for playing network programs only by attachedly transmit the configuration information of software resources that the user terminal has when transmitting a request for downloading network programs.

15 Claims, 5 Drawing Sheets

(56) References Cited

U.S. PATENT DOCUMENTS

| | | | |
|---|---|---|---|
| 6,073,147 A | 6/2000 | Chan et al. | |
| 6,094,679 A | 7/2000 | Teng et al. | |
| 6,141,002 A | 10/2000 | Kanungo et al. | |
| 6,195,678 B1 | 2/2001 | Komuro | |
| 6,623,529 B1 | 9/2003 | Lakritz | |
| 6,658,160 B1* | 12/2003 | Winter | G11B 27/034 382/232 |
| 7,062,765 B1* | 6/2006 | Pitzel | G06F 8/64 709/201 |
| 7,086,051 B2* | 8/2006 | Gautney | 717/176 |
| 7,155,490 B1* | 12/2006 | Malmer et al. | 709/217 |
| 7,174,568 B2* | 2/2007 | Chatani et al. | 726/27 |
| 7,219,344 B2* | 5/2007 | Chenelle et al. | 717/177 |
| 7,328,258 B2 | 2/2008 | Koide et al. | |
| 7,982,802 B2 | 7/2011 | Yoo et al. | |
| 2004/0081434 A1* | 4/2004 | Jung | G11B 27/10 386/244 |
| 2004/0093595 A1* | 5/2004 | Bilange | 717/171 |
| 2005/0078947 A1* | 4/2005 | Chung | G11B 27/034 386/241 |
| 2005/0097543 A1* | 5/2005 | Hirayama | 717/168 |
| 2005/0108026 A1* | 5/2005 | Brierre | G06Q 50/10 725/137 |
| 2005/0169606 A1* | 8/2005 | Yoo | G11B 27/105 386/244 |
| 2005/0262546 A1* | 11/2005 | Murase et al. | 725/131 |
| 2006/0078301 A1* | 4/2006 | Ikeda | G11B 27/105 386/240 |

FOREIGN PATENT DOCUMENTS

| | | |
|---|---|---|
| JP | 7264562 A | 10/1995 |
| JP | 9182038 A | 7/1997 |
| JP | 2001035464 | 2/2001 |
| JP | 2001092814 A | 4/2001 |
| JP | 2001265685 A | 9/2001 |
| JP | 2003029736 | 1/2003 |
| JP | 2003233597 A | 8/2003 |
| JP | 2004110573 A | 4/2004 |
| JP | 2006155454 A | 6/2006 |
| TW | 200527387 A | 8/2005 |
| TW | 200540653 | 12/2005 |
| WO | 02054277 | 7/2002 |
| WO | 2004056115 | 7/2004 |

* cited by examiner

METHOD AND APPARATUS FOR CONFIGURING SOFTWARE RESOURCES FOR PLAYING NETWORK PROGRAMS

FIELD OF THE INVENTION

The present invention relates to the technical field of playing network programs, in particular to a method and apparatus for configuring software resources for playing network programs.

BACKGROUND OF THE INVENTION

The programs that could be viewed by the users are not limited to the programs stored on the optical disc due to emergence of network optical disc formats (for example, enhanced eDVD optical disc format, Blue-ray disc BD format, etc.), they extend to the network programs related to the contents on optical discs. Downloading programs from networks and playing these programs have become a very popular entertainment way.

When distributing network optical discs, an optical disc content provider provides in a network server the network programs corresponding to the contents on the distributed optical discs for downloading by optical disc user. In general, these network programs are played synchronously with the video and audio contents on the local optical discs to enhance playing effect. As a part of the contents of network program, some enhanced information like web page, animation, program introduction or staff introduction, etc. are downloaded to the user terminal along with the network programs.

These enhanced information often includes some novel fonts or glyphs, original graphics or motion vector graphics with animation effect, etc. In addition, the network programs stored in the network are often updated, so are the fonts and graphics required for playing the programs.

The software resources supporting these new contents, such as the font library supporting the fonts that need to be displayed, graphic library supporting graphic display or other auxiliary programs for enhancing playing, are usually downloaded along with network programs. Taking a font as an example, because different fonts of a character have different dot matrix structures and profiles, corresponding font data (i.e. dot matrix structure data and profile data, etc.) are required for displaying a character according to a particular font, otherwise it is impossible to output and display this character. Likewise, the playing effect will be affected if a graphic, especially a new graphic, has no corresponding graphic library locally.

Usually, the software resources downloaded together with the network programs are quite large, for example, a font library file ranges from 3 MB to 20 MB. Thus, the time required for downloading is longer, especially in the case of network bandwidth shortage or network congestion, the playing of network programs may have to be interrupted and the playing quality cannot be guaranteed, as a result the users lost interest of viewing the programs.

One of the methods for solving the problem of downloading software resource is to download in advance the software resources that may be used to the user terminal playing apparatus. On one hand, this method can satisfy the requirements in most cases, but the limited storage space of the user terminal playing apparatus will be occupied. On the other hand, because network programs and enhanced information are often updated, the software resources that are downloaded in advance cannot cover all the required fonts, graphics, programs, etc., in particular the newly arising fonts, graphics, programs, etc.

Another method for solving the problem of downloading software resource is to determine the locally absent resources through an optical disc playing apparatus after downloading the network programs, then transmit a request for downloading the absent software resources to the network server. If, during playing the network programs, the playing apparatus finds that the font data of a certain character is absent, then requests for downloading from the network server and allocates certain network bandwidth to download the required font data, the process of playing programs will be inevitably affected. Such method cannot guarantee the playing quality and the process of playing programs is loaded with trivial details.

Therefore, it needs to provide a method and apparatus for configuring software resources for playing network programs so as to realize rapidly the configuration of software resources and avoid the delay or interrupt of playing network program due to fonts and graphics being not supported or not supported timely.

OBJECT AND SUMMARY OF THE INVENTION

The technical problem to be solved by the invention is to provide a method and apparatus for configuring software resources for playing network programs so as to overcome the problems existing in the prior art.

According to an embodiment of the invention, a method for configuring software resources in a playing apparatus is provided. Said software resources are used to play a network program. The method comprises the steps of: transmitting a request for downloading said network program to a network server, said request including the configuration information of local software resources; receiving said network program and software resources transmitted by said network server, said received software resources including software resources that are required for playing said network program but are locally absent; and combining the received software resources with said local software resources to play said network program.

According to an embodiment of the invention, an apparatus for configuring software resources in a playing apparatus is provided. Said software resources are used to play a network program. Said apparatus comprises: a transmitting means for transmitting a request for downloading specified network program to a network server, said request including the configuration information of local software resources; a receiving means for receiving said network programs and software resources transmitted by said network server, said received software resources including software resources that are required for playing said network programs but are locally absent; and a combining means for combining the received software resources with said local software resources to play said programs.

According to an embodiment of the invention, a method for configuring software resources in a network server is provided. Said software resources are used to play a network program at a user terminal. The method comprises the steps of: receiving a request for downloading a specified network program transmitted by said user terminal, said request including the configuration information of software resources at said user terminal; acquiring the information of software resources required for playing said network program; and comparing said received information with said acquired information to determine software resources to be transmitted to said user terminals, the software resources to be transmitted to said user terminal include the software resources that are required for playing programs but are absent at the user terminal.

According to an embodiment of the invention, an apparatus for configuring software resources in a network server is provided. Said software resources are used to play a network program at a user terminal. Said apparatus comprises: a receiving means for receiving a request for downloading a specified network program transmitted by said user terminal, said request including configuration information of software resources at said user terminal; an acquiring means for acquiring information of software resources required for playing said network programs; and a comparing means for comparing said received information with said acquired information to determine software resources to be transmitted to said user terminal, said software resources to be transmitted to the user terminal include the software resources that are required for playing said programs but are absent at the user terminal.

According to the invention, the user terminal only needs to attachedly transmit the configuration information of software resources (for example, font library resource, graphic library resource, program resource, etc.) at the user terminal when transmitting a request for downloading a network program to the network server. Then the font data that are required for playing downloaded network programs but are absent at the user terminal can be obtained, whereas processing operations on the rest information are performed by the network server. The network server compares the software resources required for playing the network program according to the configuration information of software resources at the user terminal and determines the software resources that are required for transmitting the played programs to the user terminal but are absent at the user terminal, and finally transmits them to the user terminal.

When software resources and network programs are transmitted to the user terminal, the contents of the network programs and the software resources that need to be transmitted could be encapsulated to form feedback data packets to be transmitted to the user terminal, then said data packets are transmitted to the user terminal.

The method and apparatus provided by the invention can guarantee sufficient configuration of software resources during network program playing. Moreover, the playing apparatus at the local user terminal does not need any big change, it only needs to attachedly transmit the configuration information of a local software resource when transmitting a request for downloading the programs to the network server. The method and apparatus provided by the invention break through the doing in traditional technical solution, that is, first downloading programs, analyzing them and then requesting for downloading corresponding software resources from the network server. In this way, the steps and processes required for playing network programs are simplified and the optical disc playing quality is guaranteed.

Through the description of the invention made with reference to the accompanying drawings and the claims, other objects and achievements of the present invention are obvious and a comprehensive understanding of the invention can be obtained.

BRIEF DESCRIPTION OF DRAWINGS

The present invention is further explained in details through embodiments and with reference to the drawings.

In all the drawings, the same reference signs represent the same, similar or corresponding features or functions.

DETAILED DESCRIPTION OF THE INVENTION

The concept of the invention is: a request for downloading network programs transmitted from a network program playing apparatus to a network server includes the configuration information of software resources at a user terminal. The network server compares the information of the software resources required for playing network programs with the configuration information of the software resources at the user terminal, and transmits to the user terminal the software resources that are required for playing programs but are absent at the user terminal. The user terminal can combine the received software resources with the local software resources to play the downloaded network programs. The software resources may be a font library, a graphic library, motion vector graphics, or a software resource required by an application to play network programs. Below, the invention is described by taking the configuration of the font for playing a network program as an example, the configuration methods of other software resources are the same as those of font resources.

Figure 1:
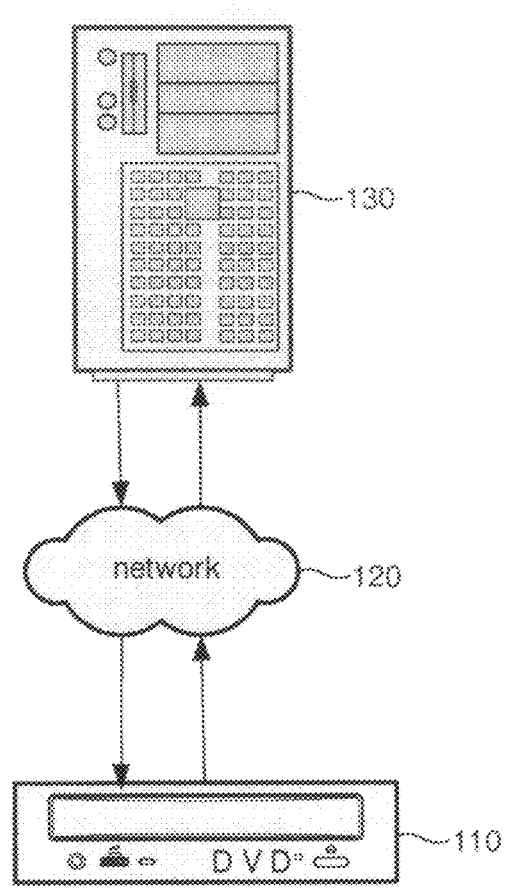
FIG. 1 is a schematic diagram of the network program playing system according to an embodiment of the invention.

FIG. 1 is a schematic diagram of the network program playing system according to an embodiment of the invention. As shown in FIG. 1, the network program playing means 110 is a network optical disc playing apparatus (the following text makes description by taking a network optical disc playing apparatus as an example), and it can be other playing apparatus capable of playing network programs, like PC, etc. According to the requirement for playing the contents of the programs stored on the optical disc or from the user, means 110 links network server 130 via network 120 and requests for downloading specified network programs.

The downloading request issued from means 110 comprises a configuration information related to the font data in means 110, for example, the description of a database of dot matrix of Chinese characters font included in means 110. The configuration information may include the name of font, the total number of the characters having such type of font, a FontMask indicating whether the dot matrixes or profile data of the characters having such type of font exist, etc. Means 110 can obtain the configuration information of the transmitted font data according to the description information of the local font data file. After receiving the downloading request transmitted by means 110 and the configuration information of font data of playing means 110 therein, network server 130 compares the information of the font data required for playing network programs with the configuration information of the received font data, determines and transmits the font data that are absent in the user terminal playing means 110 but are required for playing programs.

Playing means 110 receives font data transmitted from the network server 130 and combines the local original font library, then said network program can be played smoothly. Said font data comprises specific font names, the total amount of the characters having such type of font, a single or more dot matrixes or profile data of the characters having such type of font, etc.

The network program playing system provided by the invention simplifies the processes of downloading and playing network programs. It does not need to download the whole font library corresponding to network program, instead it only needs the local user terminal to transmit once information, then the required program is obtained and the corresponding configuration of font data is realized.

Figure 2:
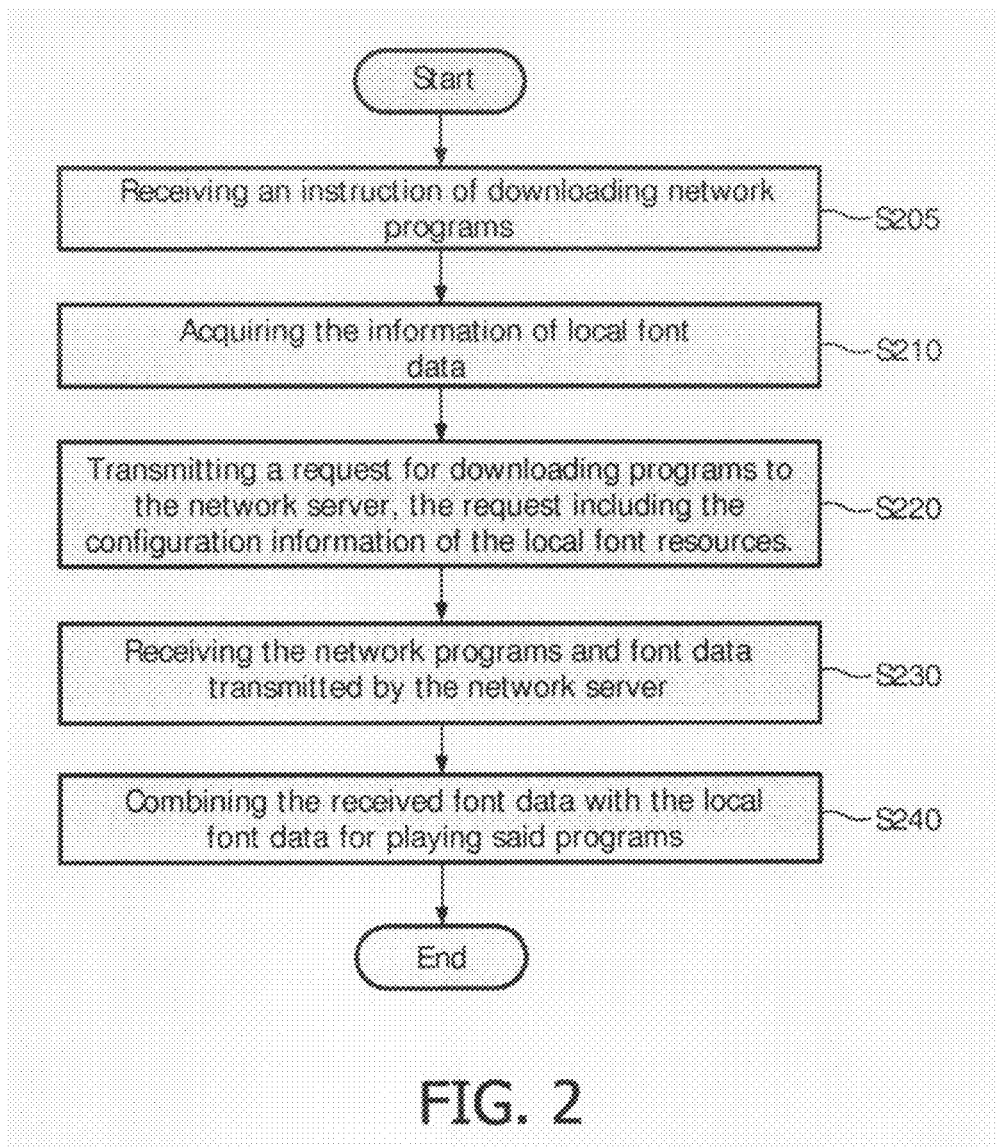
FIG. 2 is a flow chart of a method for configuring software resources in a playing apparatus according to an embodiment of the invention.

FIG. 2 is a flow chart of a method for configuring software resources in a playing apparatus according to an embodiment of the invention. First, the network program playing apparatus receives an instruction of downloading network programs from user or network optical disc during program playing, (step S205).

Then, the configuration information for local font data is acquired (step S210). The configuration information of font data at the local user terminal is information describing the font data at local user terminal. A general program playing apparatus can correspondingly obtain a description information (called as a fontmask in this example) according to the local font data, for example, it may be represented as:
FontMask=#(singleFontMask)
SingleFontMask=(FontFaceName/CharacterGlyphAvailableBitMask)
FontFaceName=Face Name of a specific font
CharacterGlyphAvailableBitMask=A Hex decimal value that indicates which character glyph exists and which doesn't exist in local system From the information, the network server can analyze the configuration information of the font at the local user terminal, for example, the font name, the version level of font data, the total number of the characters having such type of font, the fontmask indicating whether the dot matrixes of the characters having such type of font exist, etc.

Next, a request for downloading network programs is transmitted to the network server according to the downloading instruction. This request includes the configuration information of local font data (step S220).

After processing the downloading request and font information, the network server transmits to the user terminal the network program and the font data that are required for playing said program but are absent at the local user terminal. The font required for playing network program may be a part of font library. For example, Chinese simplified font library has the fonts of thousands of characters, but the playing process only uses 200 fonts therein, while 180 font data (font dot matrix or profile data) among 200 fonts can be found in the local font library that the user terminal has, whereas the other 20 font data (font dot matrix or profile data) need to be downloaded form the network.

The network server encapsulates the network program and the font data that need to be transmitted and transmits them to the user terminal. The user terminal receives the network programs and font data transmitted from the network server (step S230), then combines the received font data with the local font library file to play said network program (step S240). Said font data include a specific font name, the total amount of the characters having such type of font, a single or more dot matrixes or profile data of the characters having such type of font, etc.

The font data downloaded to the user terminal will be combined with the local original font library at the user terminal. If the downloaded font data do not belong to the same type of font data file as all the local font data, i.e. they cannot be classified as one of local font data, then it needs to establish separately a font file for the downloaded font data. The font library file at the user terminal will be supplemented and expanded along with the downloading of different network programs.

According to the above method, the user terminal only needs to attachedly transmit the description information of the font data at the local user terminal when transmitting a request for downloading, then the purpose of configuring and playing corresponding font will be achieved. The font parsing and displaying engine of the playing apparatus at the user terminal do not have any change and the playing effect is not affected.

Figure 3:
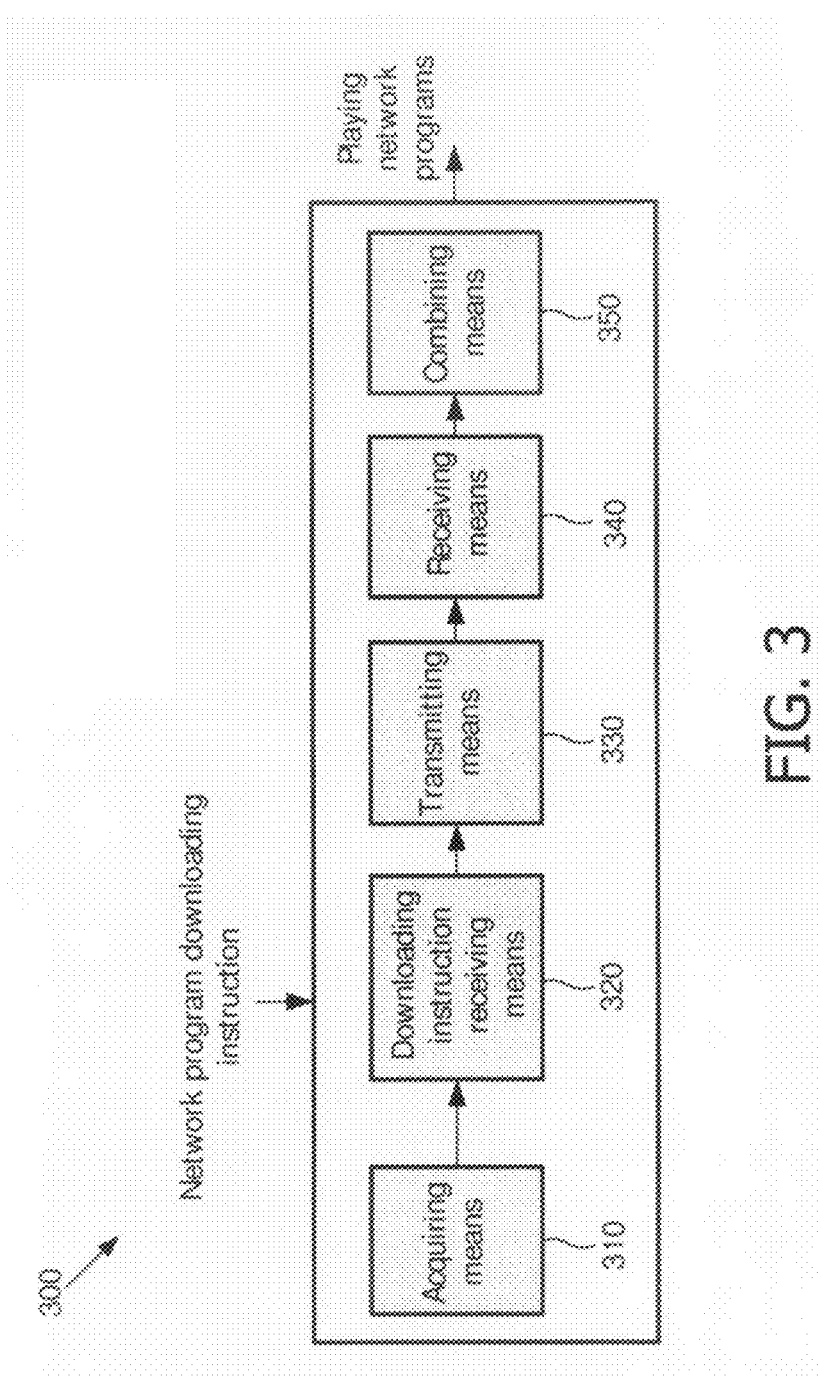
FIG. 3 is a block diagram of an apparatus for configuring software resources in a playing apparatus according to an embodiment of the invention.

FIG. 3 is a block diagram of an apparatus 300 for configuring software resources in a playing apparatus according to an embodiment of the invention. Apparatus 300 may comprise an acquiring means 310 for acquiring the configuration information of the local font data. The acquired information of the font data may include: the name of font, the total number of the characters having such type of font, a fontmask indicating whether the dot matrix or profile data corresponding to each character having such type of font exists, etc. Apparatus 300 further comprises a downloading instruction receiving means 320 for receiving an instruction of downloading network programs from the user or an instruction of downloading network programs required for playing the program on network optical disc.

Apparatus 300 further comprises a transmitting means 330 for transmitting a request for downloading network program to the network server, this request includes the configuration information of the font data at the local user terminal. Usually, the description information of the local font data can be obtained from the description information of font data file, including the name of font, the total number of the characters having such type of font and a fontmask indicating whether the dot matrix or profile data corresponding to each character having such type of font exists, etc.

Apparatus 300 further includes a receiving means 340 for receiving font data and network programs downloaded from the network server.

Apparatus 300 further includes a combining means 350 for combining the received font data with the local font data file to play said program. The manner of combining the received data with the local font data comprises adding the received font data to the local font library file or creating a separate font library file, etc.

With apparatus 300, the network program playing apparatus can efficiently and rapidly configure and play the font that are required for playing network program but are absent at the local user terminal.

Figure 4:
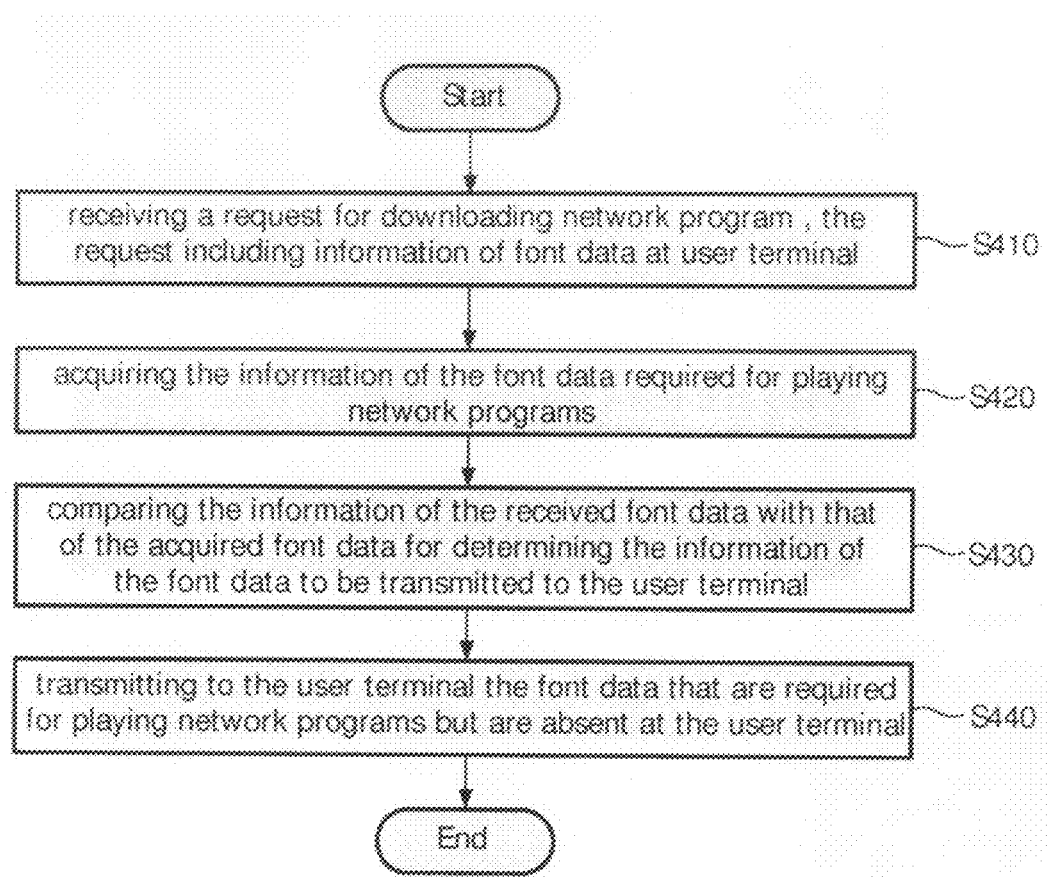
FIG. 4 is a flow chart of a method for configuring software resources in a network server according to an embodiment of the invention.

FIG. 4 is a flow chart of a method for configuring software resources in a network server according to an embodiment of the invention. As shown in FIG. 4, first, the network server receives a request for downloading network program transmitted from the user terminal, said request including the configuration information of software resource at said user terminal (step S410).

Then, according to the received downloading request, the network server obtains the information of font data required for playing network programs requested for downloading (step S420). Usually, the information of the font data required for playing network programs can be obtained from the description information of network programs.

Then, a comparison is made between the information of the font data required for playing network programs and the information of the font data at the user terminal to determine the information to be transmitted to the user terminal (step 430). The information to be transmitted to the user terminal is generally the font data that are required for playing network programs but are absent at the user terminal.

The contents of the network program requested to be played and the font data that are needed by said program but are absent at the user terminal are encapsulated to form feedback data packets that are transmitted to the user terminal. The feedback data packets also include the configuration information of necessary font (for example, name of font, index, the total number of the dot matrix of profile data of the included characters having such type of font or, etc.)

Finally, the network server transmits to the user terminal the font data that are required for transmission (step S440). The transmitted font data can be encapsulated into a feedback data packet together with a network program and is transmitted to the user terminal along with the network program.

According to the above method provided by the invention, the user terminal only needs to transmit once a request to the network server, this request includes the configuration information of the font data at the user terminal, then the network program and font data supporting playing of the network program can be downloaded and obtained. The network server finishes analysis and comparison of the font required by network programs and the configuration information of the font data that the user terminal has, determines and transmits the font that needs to be downloaded to the user terminal.

Figure 5:
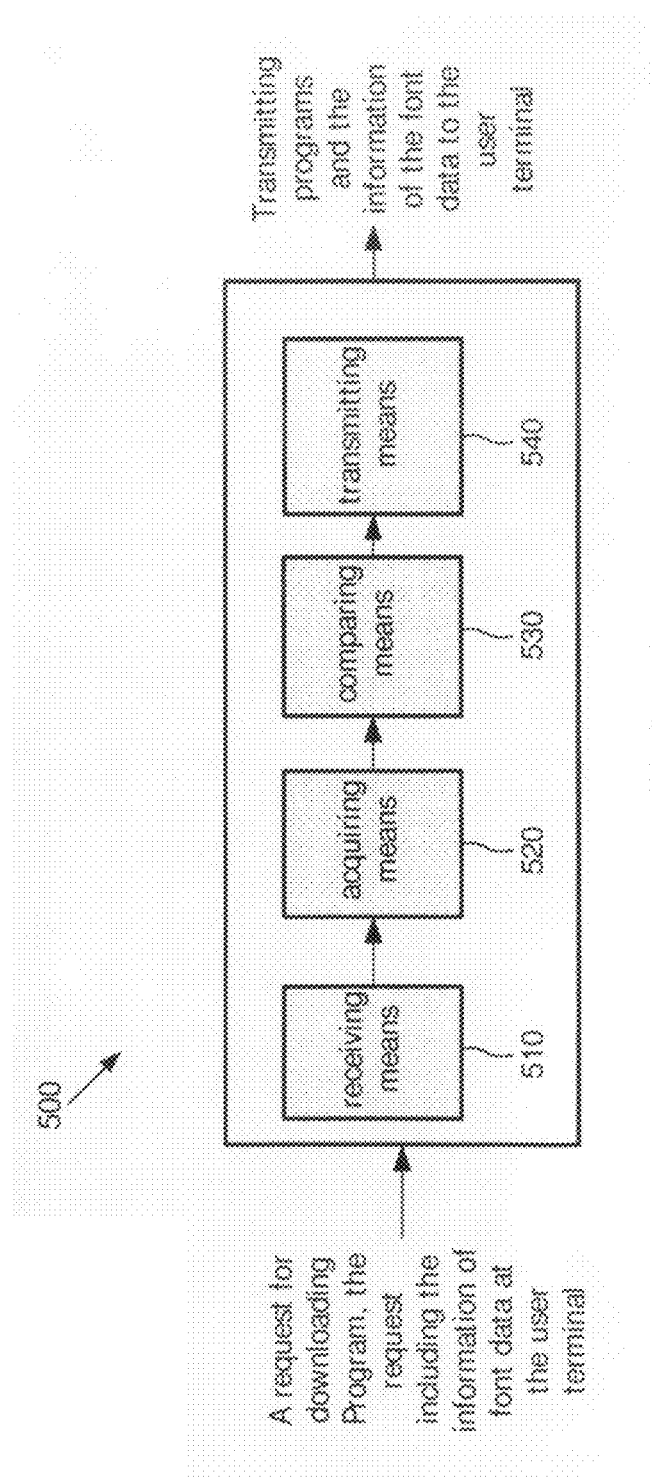
FIG. 5 is a block diagram of an apparatus for configuring software resources in a network server according to an embodiment of the invention.

FIG. 5 is a block diagram of an apparatus 500 for configuring software resources in a network server according to an embodiment of the invention. As shown in FIG. 5, apparatus 500 comprises a receiving means for receiving a request for downloading network programs from the user terminal, the request including the configuration information of font data at the user terminal.

Apparatus 500 further comprises an acquiring means 520 for acquiring the font data required for playing network programs. If the description information of network programs contains the requirement information for playing the needed font, then the function of said acquiring means 520 includes acquiring requirement information for font data.

Apparatus 500 further comprises a comparing means 530 for comparing the information of font data required for playing network programs with the information of font data at the user terminal so as to determine the information of font data to be transmitted to the user terminal, which generally refers to the font data that are required for playing network program but are absent at the user terminal.

Apparatus 500 further comprises a transmitting means 540 for transmitting to the user terminal the determined font data and network program that need to be transmitted to the user terminal.

Apparatus 500 further comprises a data encapsulating means for encapsulating the contents of network programs that are requested to be played and the font data that are needed by said program but are absent at the user terminal to form feedback data packets to be transmitted to the user terminal. Then these packets are transmitted to the user terminal via means 540. The data encapsulation can be carried out in various manners, for example, it is performed following Multipurpose Internet Mail Extensions MIME (RFC2557) specification.

With means 500, the network server can, according to the received information of the font data at the user terminal and the information of the font data required for playing said network program, determine the information of the font data to be transmitted to the user terminal. This relieves the data processing procedure of the playing apparatus at the user terminal and simplifies the process of downloading and playing network programs. Although the invention is described above in connection with embodiments, apparently it is obvious that those skilled in the art are able to make various alternations, modifications and changes based on the contents described above. Therefore, such alternations, modifications and changes shall come within the scope of spirit and range of the appended claims.

The invention claimed is:

1. A method for configuring a software resource of a playing apparatus for playing a network program, said method comprising:
   a) transmitting a request to a network server to download said network program, said request including configuration information of a local software resource already available to said playing apparatus, wherein the local software resource is a first portion of software resources required for playing an enhanced effect, where said network program comprises video and audio content locally available to be played synchronously with enhanced information by said playing apparatus to play the enhanced effect;
   b) receiving, in response to said request, said network program and a second portion of software resources automatically determined by the network server, from the transmitted configuration information, to be absent from the local software resource and required to play the enhanced effect;
   c) combining the received second portion of the software resources with the first portion of software resources to play the enhanced effect; and
   d) playing said network program synchronously with the enhanced effect.

2. The method according to claim 1 where the local software resource having the configuration information included in the transmitted request comprises at least one of a font resource, a graphic resource, and an application.

3. The method according to claim 2 where the local software resource having the configuration information included in the transmitted request comprises a font resource including at least one of font type, total number of characters of said font type, a fontmask indicating whether dot matrix data of the characters of said font type exists locally, and a fontmask indicating whether profile data of characters of said font type exists locally.

4. The method according to claim 1 comprising, before step a), acquiring the configuration information of the local software resource.

5. An apparatus for configuring a software resource of a playing apparatus for playing a network program, said apparatus comprising:
   a transmitting module for transmitting to a network server a request to download said network program, said request including configuration information of a local software resource already available to said playing apparatus, wherein the local software resource is a first portion of software resources required for playing an enhanced effect, where said network program comprises video and audio content locally available to be played synchronously with enhanced information by said playing apparatus to play the enhanced effect;

a receiving module for receiving, in response to said request, said network program and a second portion of software resources automatically determined by the network server, from the transmitted configuration information, to be absent from the local software resource and required to play the enhanced effect;

a combining module for combining the received second portion of the software resources with the first portion of software resources to play the enhanced effect; and a playing module for playing said network program synchronously with the enhanced effect.

6. The apparatus according to claim 5 where said local software resource having the configuration information included in the transmitted request comprises at least one of a font resource, a graphic resource and an application.

7. The apparatus according to claim 6 where the local software resource having the configuration information included in the transmitted request comprises a font resource including at least one of font type, total number of characters of said font type, a fontmask indicating whether dot matrix data of the characters of said font type exists locally, and a fontmask indicating whether profile data of the characters of said font type exists locally.

8. The apparatus according to claim 5 comprising an acquiring means for acquiring the configuration information of the local software resource for inclusion in said transmitted request to said network server.

9. A method for configuring a software resource in a network server where said software resource is used for playing a network program at a user terminal, said method comprising:

receiving a request from the user terminal for downloading said network program, said request including configuration information of a local software resource already available to said user terminal, wherein the local software resource is a first portion of software resources required for playing an enhanced effect, where said network program comprises video and audio content locally available to be played synchronously with enhanced information by said user terminal to play the enhanced effect;

automatically determining by the network server, from the configuration information, a second portion of software resources to be absent from the local software resource and required to play the enhanced effect;

acquiring the second portion of the software resources by the network server;

transmitting to said user terminal said second portion of software resources;

combining the received second portion of the software resources with the first portion of software resources to play the enhanced effect; and playing said network program synchronously with the enhanced effect.

10. The method according to claim 9 where said local software resource having the configuration information included in the transmitted request includes at least one of a font resource, a graphic resource, and an application.

11. The method according to claim 10 where the local software resource having the configuration information included in the request comprises a font resource including at least one of font type, total number of characters of said font type, a fontmask indicating whether dot matrix data of the characters of said font type exists locally, and a fontmask indicating whether profile data of characters of said font type exists locally.

12. An apparatus for configuring a software resource in a network server, where said software resource is used for playing a network program at a user terminal, said apparatus comprising:

a receiving module for receiving a request transmitted by the user terminal for downloading said network program, said request including configuration information of a local software resource already available to said user terminal, wherein the local software resource is a first portion of software resources required for playing an enhanced effect, where said network program comprises video and audio content locally available to be played synchronously with enhanced information by said user terminal to play the enhanced effect, wherein a second portion of software resources is automatically determined by the network server, from the configuration information, to be absent from the local software resource and required to play the enhanced effect;

an acquiring module for acquiring the second portion of the software resources;

a transmitting module for transmitting to said user terminal said second portion of software resources;

a combining module for combining the received second portion of the software resources with the first portion of software resources to play the enhanced effect; and a playing module for playing said network program synchronously with the enhanced effect.

13. The apparatus according to claim 12 where said local software resource having the configuration information included in the transmitted request includes at least one of a font resource, a graphic resource, and an application.

14. The apparatus according to claim 13 where the local software resource having the configuration information included in the transmitted request includes at least one of font type, total number of characters of said font type, a fontmask indicating whether dot matrix data of the characters having such font type exists locally, and a fontmask indicating whether profile data of the characters of said font type exists locally.

15. The apparatus according to claim 12 and comprising an encapsulating means for encapsulating said network program and said necessary portion of said acquired information for said transmission to said user terminal.

* * * * *